United States Patent [19]

Adkins et al.

[11] Patent Number: 5,584,589
[45] Date of Patent: Dec. 17, 1996

[54] GRAPHICS PRINTER ROLLER TRANSPORT APPARATUS AND METHOD

[75] Inventors: David A. Adkins, Robbinsdale; Steven J. Fitzsimmons, Chaska; James M. Jordan, Eagan; Richard C. Nubson, Eden Prairie; Ronald L. Sattler, Bloomington, all of Minn.

[73] Assignee: DataCard Corporation, Minnetonka, Minn.

[21] Appl. No.: 185,774

[22] Filed: Jan. 25, 1994

Related U.S. Application Data

[63] Continuation-in-part of Ser. No. 33,854, Mar. 19, 1993, abandoned.

[51] Int. Cl.⁶ ..................................................... B41J 11/50
[52] U.S. Cl. ......................... 400/584; 400/596; 400/630; 400/636; 400/706
[58] Field of Search ...................................... 400/551, 555, 400/559, 568, 569, 596, 595, 603, 630, 635, 636, 636.1, 636.2, 706, 707, 707.1, 708, 708.1

[56] References Cited

U.S. PATENT DOCUMENTS

| | | | |
|---|---|---|---|
| 3,790,159 | 2/1974 | Hatzmann et al. | 271/4 |
| 4,439,035 | 3/1984 | Landa | 101/425 |
| 4,488,830 | 12/1984 | Rünzi | 400/636 |
| 4,650,350 | 3/1987 | Dorner | 400/120 |
| 4,789,259 | 12/1988 | Katayanagi | 400/624 |
| 4,865,305 | 9/1989 | Momiyama et al. | 400/636 X |
| 5,061,095 | 10/1991 | Asai et al. | 400/605 |
| 5,074,690 | 12/1991 | DelSignore, II et al. | 400/322 |
| 5,182,991 | 2/1993 | Patuszynski et al. | 101/216 |
| 5,239,926 | 8/1993 | Nubson et al. | 400/120 X |
| 5,251,554 | 10/1993 | Eckert, Jr. et al. | 101/91 |

FOREIGN PATENT DOCUMENTS

| | | | |
|---|---|---|---|
| 0420336A1 | 4/1991 | European Pat. Off. | |
| 2536551 | 5/1984 | France | |
| 210486 | 10/1985 | Japan | 400/636 |
| 0034764 | 2/1989 | Japan | 400/708 |
| 2200463 | 8/1990 | Japan | |
| 0018379 | 1/1992 | Japan | 400/596 |
| 2202492 | 9/1988 | United Kingdom | |

OTHER PUBLICATIONS

"Control System for Position of Cutting of Plastic Tape and Paper for Packaing Roller Machine", *Illustrative Collection of Application Automatic Electric Systems*, pp. 37–39, (Lin Yeong Bin ed. Mar. 1989).

Newcard User Manual (40 pgs.) Datacard.

Newcard Printer AP170 Manual (30 pgs.) Fima USA Inc. 1992.

*Primary Examiner*—Christopher A. Bennett
*Attorney, Agent, or Firm*—Merchant, Gould, Smith, Edell, Welter & Schmidt, P.A.

[57] ABSTRACT

A graphics printer apparatus and method using sensors to detect the position of a work piece relative to a print head. A single drive motor driving the feed rollers and a print roller.

29 Claims, 15 Drawing Sheets

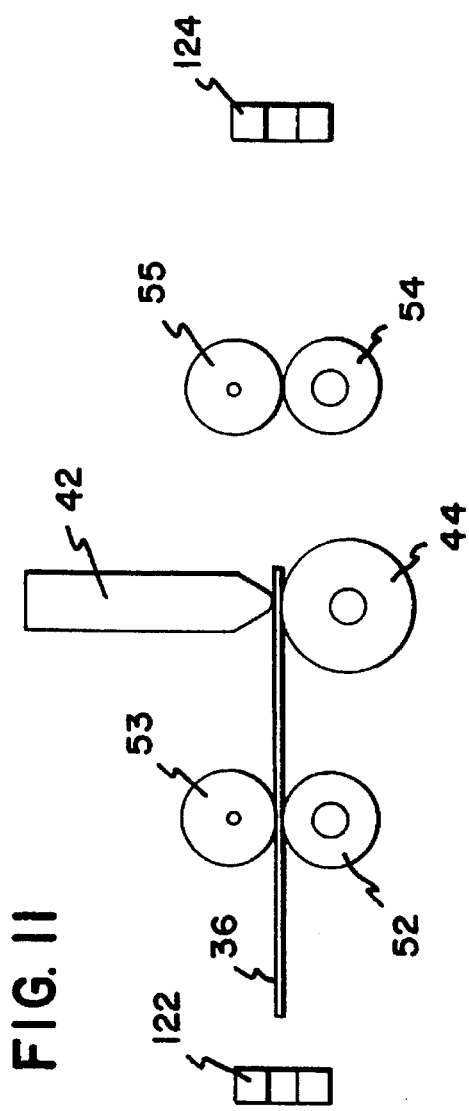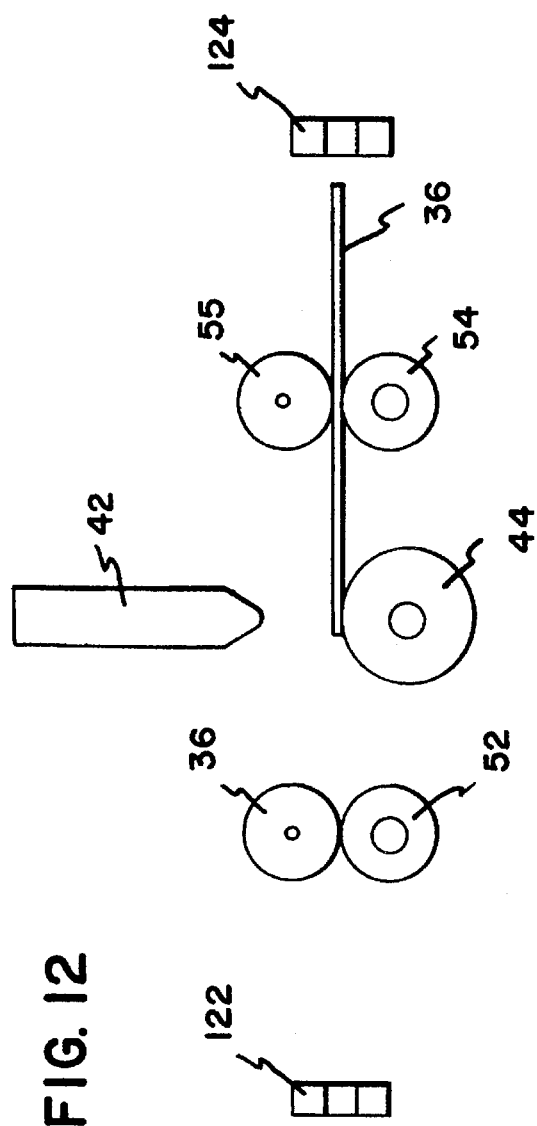

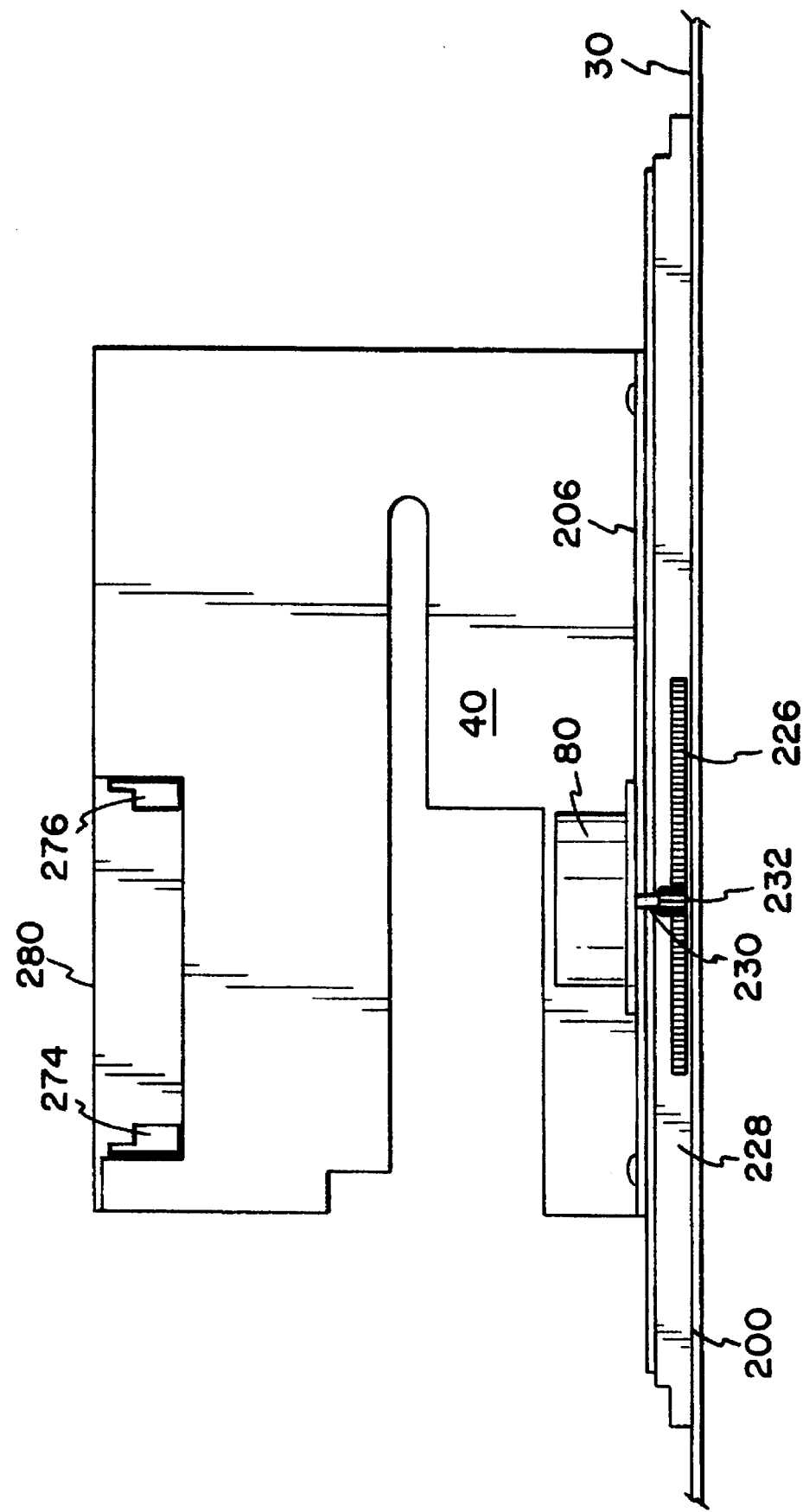

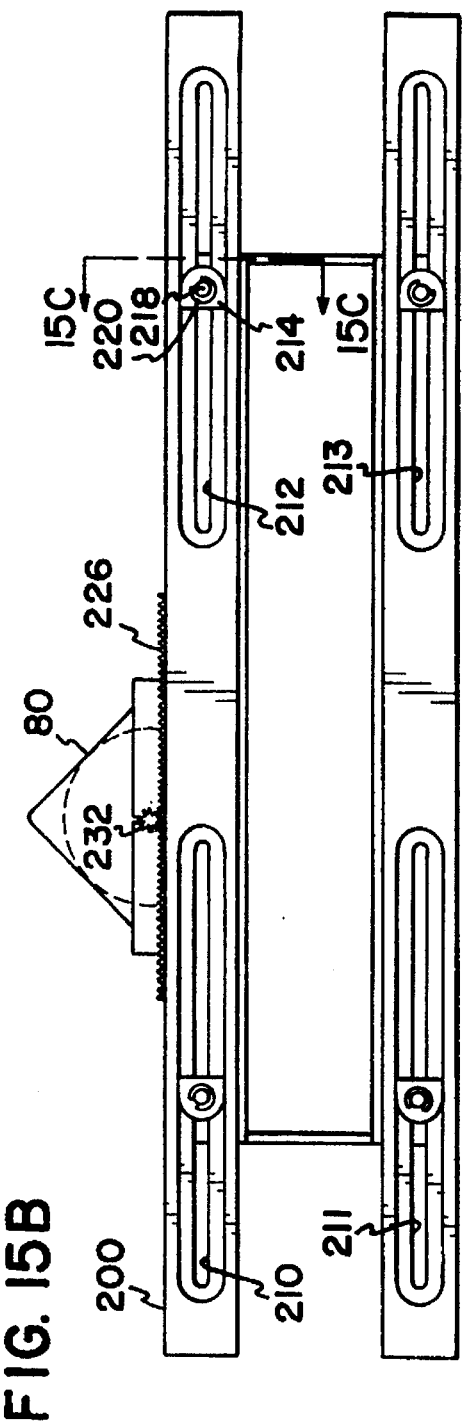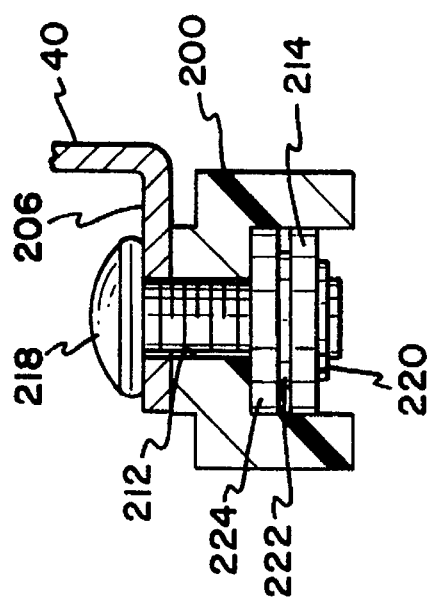
FIG. 15B
FIG. 15C 4,584,589

GRAPHICS PRINTER ROLLER TRANSPORT APPARATUS AND METHOD

This application is a continuation-in-part of application Ser. No. 08/033,854 filed Mar. 19, 1993, now abandoned.

BACKGROUND OF THE INVENTION

The present invention pertains to a graphics printer roller transport apparatus and method for transporting workpieces through a multi-pass graphics printer apparatus.

Currently, graphics printers are used to print images onto a work item such as plastic cards. One frequently used application is to create photo identification (ID) cards bearing an image of the card holder. Card holder images are captured by use of such apparatus as video cameras or scanners. Once the card holder images are digitized they are typically displayed on a display monitor where the image is edited; e.g., sized and cropped, for use on the ID card. Once the images are suitably adjusted for use on the ID card, they are electronically stored for subsequent printing onto an ID card using a graphics printer apparatus.

There are various graphics printing apparatus and methods for printing images onto workpieces such as ID cars. The existing systems are usually rather expensive and complicated. In addition, many systems do not provide the desired resolution. A typical method for printing a color image on a workpiece is to use a color ribbon having three different primary color panels; yellow, magenta, and cyan. To create a color image, the printer apparatus sequentially prints each of the three primary colors onto the workpiece to create a composite color image. This is typically referred to as multipass printing. Multipass printing requires that the printer apparatus be accurately positioned relative to the workpiece for the printing of each primary color. Unless the printer apparatus and workpiece are properly positioned unwanted blurring will occur due to misalignment of the three primary colors in the color image.

In an effort to provide the desired image clarity, existing printer apparatus are often expensive and complex in their structure. One of the most expensive and complex aspects of these printer apparatus is the transport mechanism used to transport the workpiece past the print head and then reposition the workpiece and/or print head for subsequent passes during the multipass printing process.

Single pass printers have used roller transport systems to transport the workpiece past the printer. However, these roller transport systems are typically deemed inaccurate for multipass printing. Typically roller transport systems use a sensor to locate either the leading or trailing edge of the workpiece. The workpiece is typically moved under the print head at a rate equal to the print resolution by a stepper motor rotating one motor step per print line. Gears and/or belts are used to produce an acceptable ratio so that a single motor step movement equals a print line. The maximum sensing error in such a system is a single motor step or one print line. For multipass printing, this is usually considered an unacceptable error.

The present invention provides a low cost graphics printer apparatus using a roller transport system which provides desired image quality. In addition, various embodiments of the present invention solves many other problems associated with existing graphics printers.

SUMMARY OF THE INVENTION

The present invention relates to a graphics printer apparatus and method.

An advantage of one embodiment of the present invention is that it provides a relatively inexpensive graphics printer apparatus and method.

Yet another advantage of one embodiment of the present invention is that it provides a graphics printer apparatus and method which provides the resolution desired in photo ID card applications.

These and various other advantages and features of novelty which characterize the invention are pointed out with particularity in the claims annexed hereto and forming a part hereof. However, for a better understanding of the invention, its advantages, and the objects obtain by its use, reference should be made to the accompanying drawings and descriptive matter, which form a further part hereof, and in which there is illustrated and described a preferred embodiment of the invention.

BRIEF DESCRIPTION OF THE DRAWINGS

In the drawings, wherein like reference numerals generally indicate corresponding parts throughout the various views.

FIGS. 9–14 are diagrammatic illustrations of workpiece positioning during a printing process; and FIG. 15A is a side elevational view of the carriage assembly;

FIG. 15B is a bottom view of the carriage assembly;

FIG. 15C is view as seen generally along line 15C–15C of FIG. 15B;

DETAILED DESCRIPTION OF A PREFERRED EMBODIMENT OF THE PRESENT INVENTION

Figure 1:
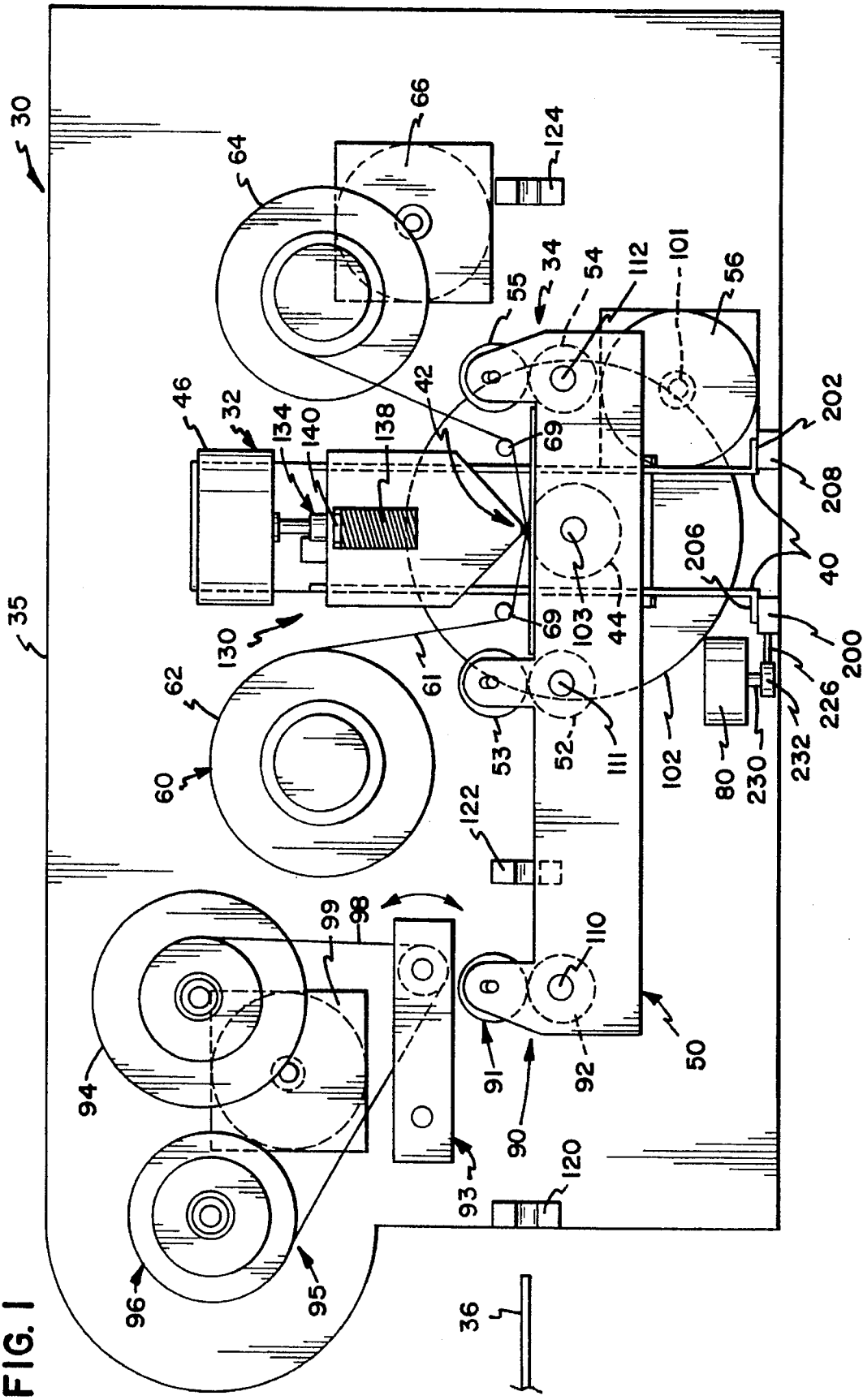
FIG. 1 is a side elevational view of an embodiment of a graphics printer apparatus, including a print mechanism and a roller transport mechanism, in accordance with the principles of the present invention.
Figure 2:
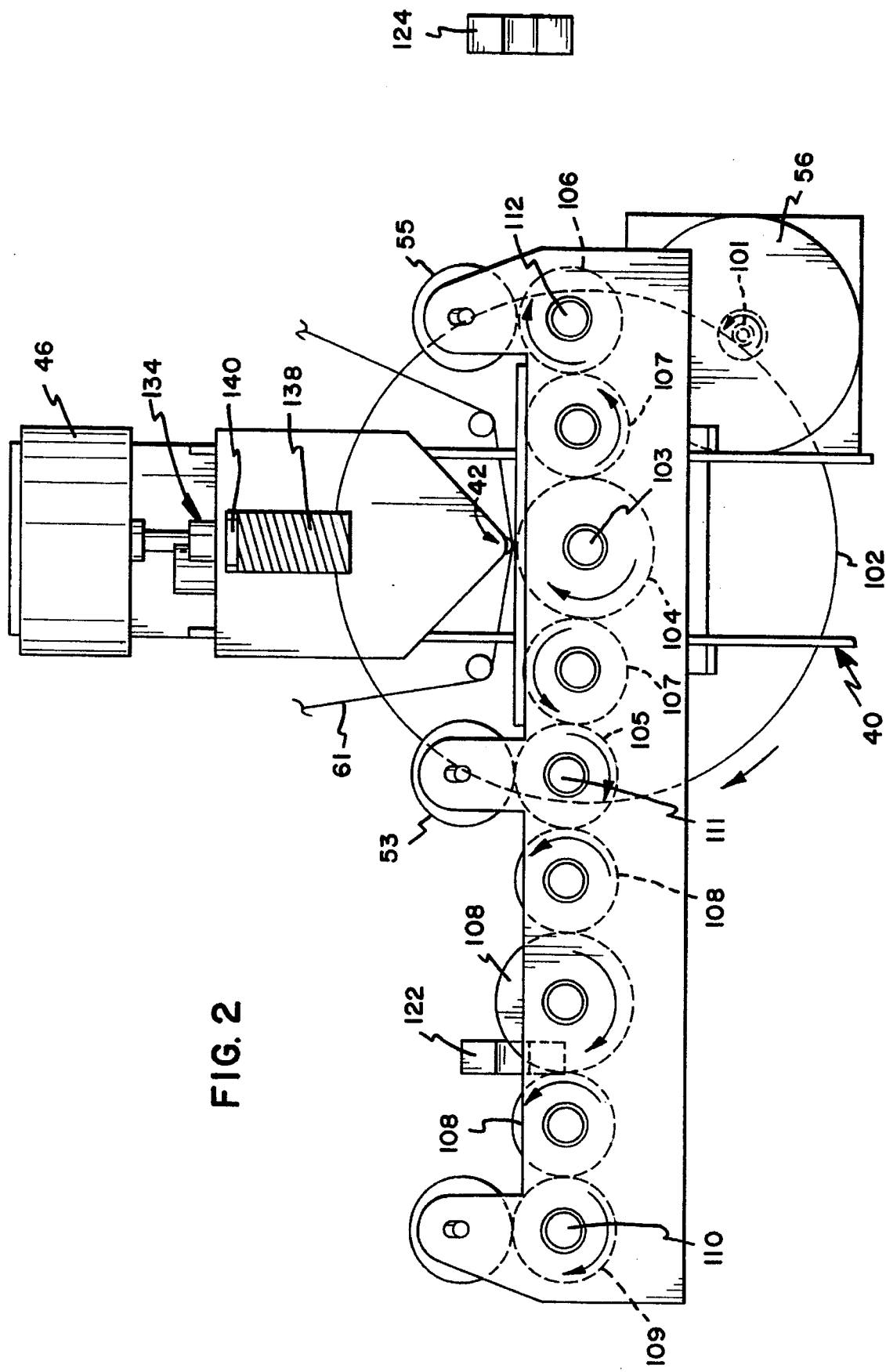
FIG. 2 is a side elevational view of the printer apparatus embodiment shown in FIG. 1, illustrating the drive connection between the feed rollers and the printer roller.
Figure 3:
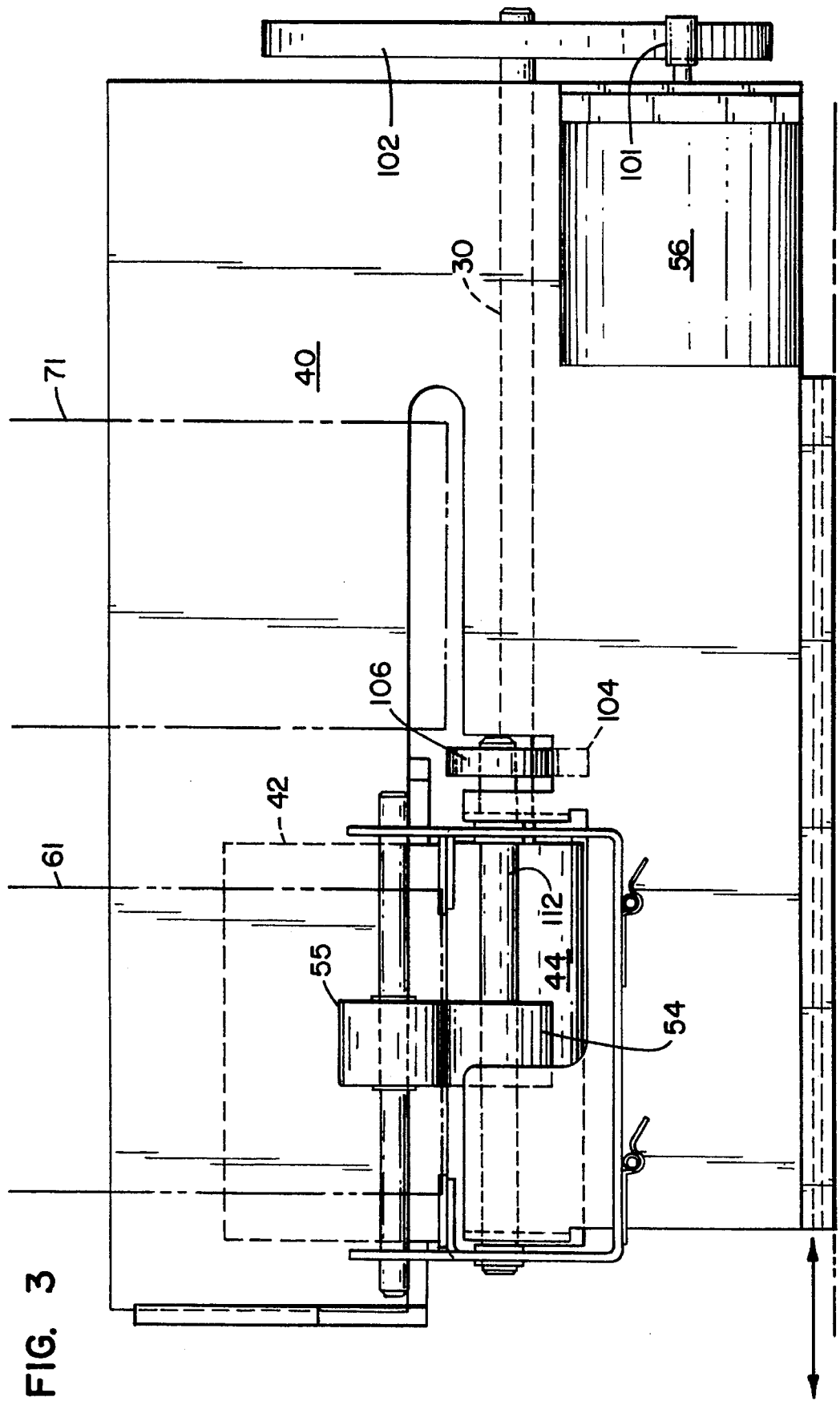
FIG. 3 is an end view of the printer apparatus.

Illustrated in FIG. 1 is an embodiment of a printer apparatus in accordance with the present invention, the printer apparatus being generally referred to by the reference numeral 30. As shown in FIG. 1, the printer apparatus 30 includes a printer carriage assembly 32 and a workpiece roller transport carriage assembly 34. A workpiece such as a plastic card 36, is illustrated prior to being fed into the printer apparatus 30. The printer carriage assembly 32 and the transport carriage assembly 34 are mounted onto a housing 35 for lateral movement thereof.

Referring now to FIGS. 1–6, the printer carriage assembly 32 includes a support frame 40, a thermal print head 42, a print roller 44, and a print head drive motor 46 for raising and lowering the print head 42. A print head home photocell might be used to detect when the print head is raised above the print roller 44 into the home position and not in contact with the print roller 44.

The workpiece transport carriage assembly 34 includes a support frame 50, a feed roller 52 and an associated idler roller 53, a feed roller 54 and an associated idler roller 55, and a transport drive motor 56 for rotating the feed rollers 52,54 and the print roller 44. In the embodiment shown, the workpiece transport carriage assembly 34 is removably mounted onto the printer carriage assembly 32 by the use of spring clips which attach to cylindrical pins of the printer assembly.

In the embodiment shown, the printer apparatus 30 is capable of both printing onto a workpiece such as a card and applying a protective overlay over the card. The printer apparatus 30 is shown including a color ribbon supply system 60, including a color ribbon 61, a color ribbon supply spool 62, a color ribbon take-up spool 64, and a color ribbon drive motor 66. In addition, the printer apparatus shown includes an overlay ribbon supply, including an overlay ribbon 71, an overlay ribbon supply spool, an overlay ribbon take-up spool, and a overlay ribbon drive motor. In the embodiment shown, the print ribbon and overlay supply systems are disposed side by side. The printer apparatus 30 includes a carriage drive motor 80 for laterally moving the printer carriage assembly and transport carriage assembly laterally with respect to the ribbon supply systems so as to align the appropriate ribbon with the print head and workpiece. Guide pins 69 extend laterally of the printer apparatus on either side of the print head 42 for guiding the color ribbon 61 and the overlay ribbon 71 between the print head 42 and the print roller 44.

In the embodiment shown, a conventional three color ribbon might be used having the primary colors of yellow, magenta, and cyan disposed on discrete segments of the ribbon for conventional multipass color dye printing using a thermal print head. The location of the color segments is typically determined by appropriate placement of a ribbon sensor 63 (shown in FIG. 7), such as a photocell, which senses where the color segments begin and/or end. In addition the ribbon might include a black segment for conventional mass transfer printing onto the workpiece using various pigments.

Multipass printing is typically used for printing images onto a workpiece whereas mass transfer printing is typically used for printing bar codes and the like. The overlay ribbon might be comprised of clear mass transfer material designed to resist mechanical & chemical abrasion. During the multipass printing process the print head applies a pressure of roughly ten to twelve pounds. During the overlay process and the mass transfer process, the print head applies a pressure of twenty pounds.

It will be appreciated that as opposed to a horizontal orientation of the workpiece, the workpiece might also have a vertical orientation during the printing process. In some embodiments of the present invention, the transport carriage and printer carriage will not be capable of lateral movement.

A workpiece cleaning system might be incorporated into the printer apparatus of the present invention. In the embodiment shown, there is a card cleaning assembly 90 including two cleaning rollers 91,92 with the cleaning rollers being driven by the transport motor 56. In addition, the card cleaning assembly includes cleaning ribbon supply system 95 for cleaning the cleaning rollers. The cleaning ribbon supply system 95 includes a supply spool 96, a take-up spool 97, a cleaning ribbon 98, and a cleaning ribbon motor 99 for driving the take-up spool 97. A cleaning ribbon engagement assembly 93 which is actuated by a solenoid 94 (shown in FIG. 7), selectively engages the cleaning ribbon against the surface of the cleaning roller 91 as desired during operation. It will be appreciated that the present invention need not include the card cleaning assembly.

Figure 4:
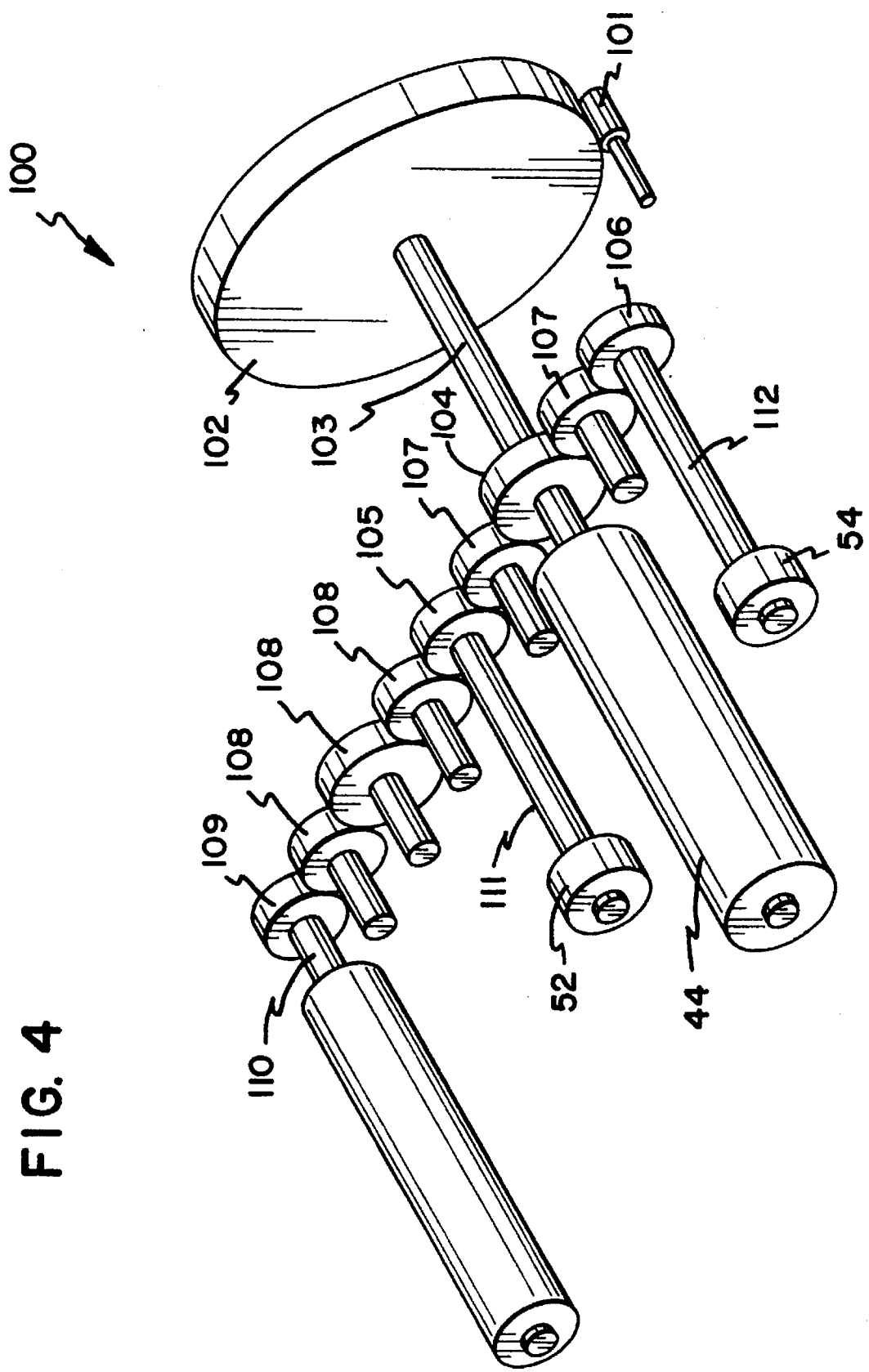
FIG. 4 is an isometric view of an embodiment of the drive connection between the transport motor and the feed rollers and printer roller.

As illustrated in FIG. 4, the workpiece transport motor 56 is part of an integrated drive mechanism 100 for directly driving the feed rollers 52,54 and the print roller 44 without the benefit of any clutches. The drive mechanism includes a motor drive shaft 101 which drives a gear reducer 102 by a friction drive interface. The gear reducer 102 provides roughly a 9.425 to 1 gear reduction ratio. A main drive shaft 103 extends from the gear reducer 102. A gear 104 and the print roller 44 are mounted on the main drive shaft 103. The gear 104 is connected by gears 107 to gears 105,106 mounted on drive shafts 111,112 of the input feed roller 52 and the output feed roller 54, respectively. Thus it will be appreciated that a single drive motor drives the feed rollers and the printer roller so as to transport the workpiece through the printer apparatus. In the embodiment shown, the cleaning roller is also driven by the transport motor by use of a plurality of gears 108 or the like interconnecting gear 105 to a gear 109 mounted on a shaft 110 of the cleaning roller. It will be appreciated that various configurations of gears might be used and that some of the gears might be replaced by drive belts or other drive connections. There are no clutches in this arrangement. The feed rollers and printer roller are all directly driven in unison by the transport motor.

Figure 5:
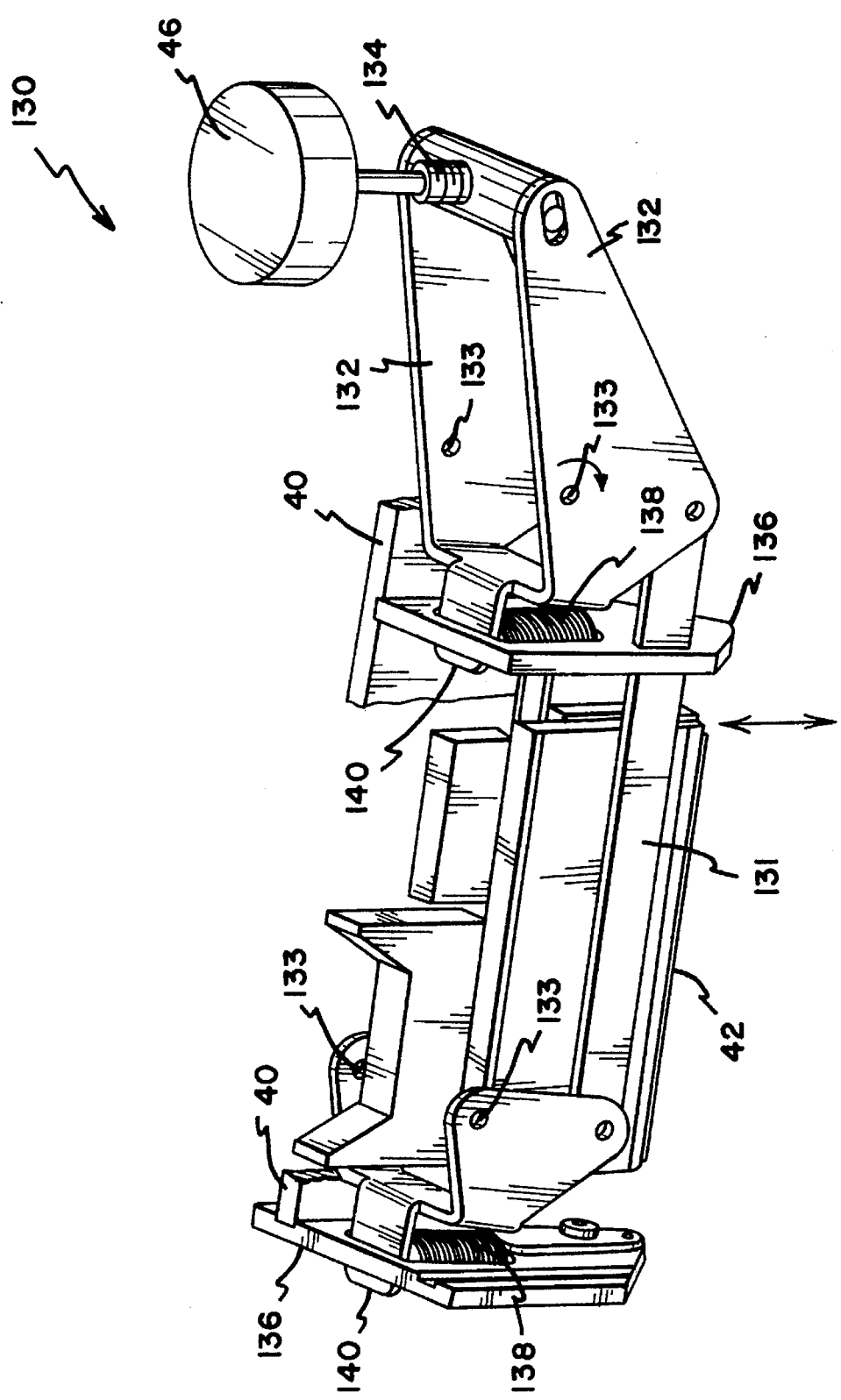
FIG. 5 is an enlarged perspective view of an embodiment of a lift apparatus for the print head.
Figure 6:
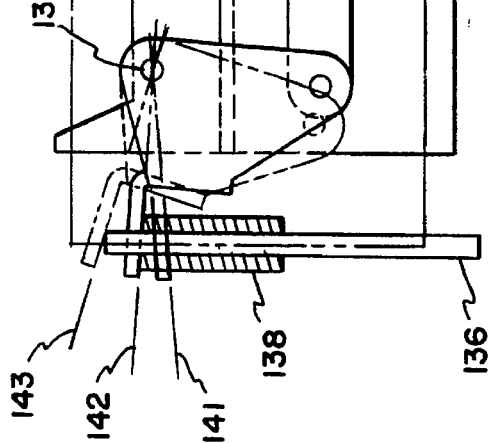
FIG. 6 is an end view of the printer apparatus illustrating placement of the print head lift apparatus.

Illustrated in FIGS. 5 and 6, is an embodiment of a print head lift apparatus 130. The lift apparatus 130 is used to raise the print head into the home position when not printing and/or when moving the printer carriage and the transport carriage laterally. In addition the lift apparatus is capable of applying differing forces on the print head 42 so that various printing pressures can be used. For example, roughly 10 to 12 pounds when color image printing and 20 pounds when overlaying the workpiece with an overlay. The print head motor 46 is connected by an elongated drive shaft 134 to one of two pivotal arm members 132 mounted on opposite sides of the print head 42. The pivotal arm members are connected by two elongated members 131 pivotally mounted to each of the arm members 132. The pivotal arm members 132 are pivotally mounted on the printer carriage frame for pivotal movement about point 133. The lift apparatus 130 includes a support framework 136 which is slidably mounted with respect to the printer carriage support framework 40 for relative movement thereof. The print head 42 is mounted onto the elongated member 131 for vertical movement therewith. As the print head motor 46 forces down on the arm members 132, the lift apparatus pivots about points 133 and the print head 42 is raised. Typically the total lift distance might be ¼ inch. When the print head motor 46 retracts the drive shaft 134 the print head 42 is lowered. Compression springs 138 are disposed between the framework 136 and tab portions 140 of the pivotal arm members 132. Variable force can be applied by the lift apparatus 130 by further pivoting the tab portions 40 downwardly thereby compressing the compression springs 138 after the print head 42 has engaged the workpiece, thus increasing the force applied by the print head 42. This is illustrated by position line 141. The raised position is illustrated by position line 143, with position line 142 illustrating the color printing position.

The feed rollers 52,54 are spaced apart by a distance less than the length of the workpiece such that the output feed roller 54 engages the workpiece before the input feed roller 52 releases the workpiece and such that one of the feed rollers is engaging the workpiece at all times during the printing process. The print roller 44 is aligned with the print head 42.

Workpiece position is monitored during the printing process by the use of photocells or other suitable sensors. In the embodiment shown there is a workpiece present photocell 120 located upstream of the printer apparatus which detects when a workpiece has been manually fed or fed from an input hopper to the printer apparatus. A trailing edge photocell 122 located downstream of the photocell 120 and upstream of the input feed roller 52 is used to detect the trailing edge of the workpiece. A leading edge photocell 124 is located downstream of the output feed roller 54 for detecting the leading edge of the workpiece.

The drive motors used in the present invention are preferably stepper motors. Various conventional stepper motors can be used. One embodiment of the transport motor moves the workpiece 1.7 mils per step. An example of a commercially available stepper motor which might be used is the Astroysn, model 17PM-M008, made by NMB Corporation which is a 200 steps per revolution or 1.8 degree motor.

Figure 7:
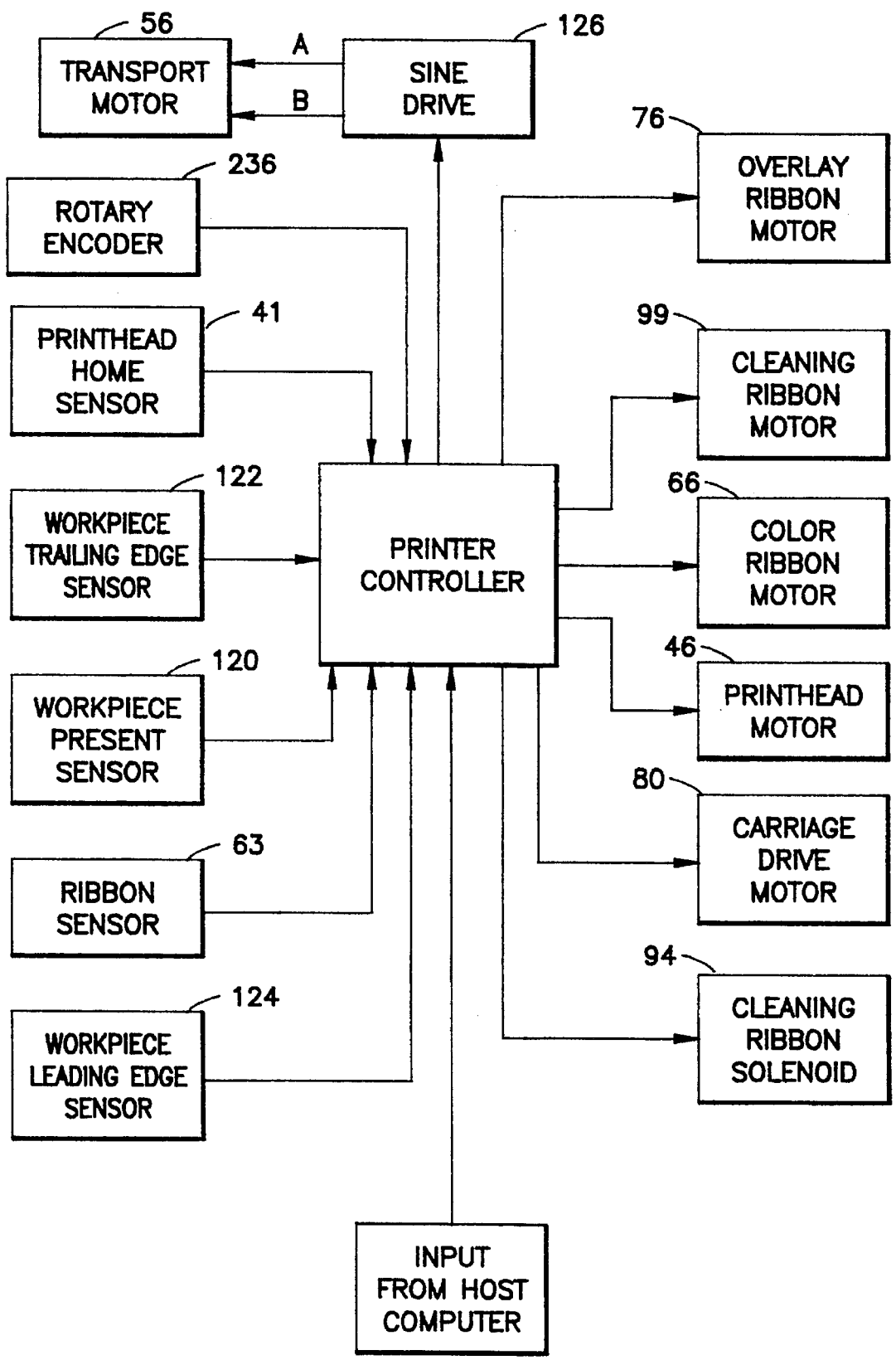
FIG. 7 is a functional block diagram of an embodiment of a control system.
Figure 8:
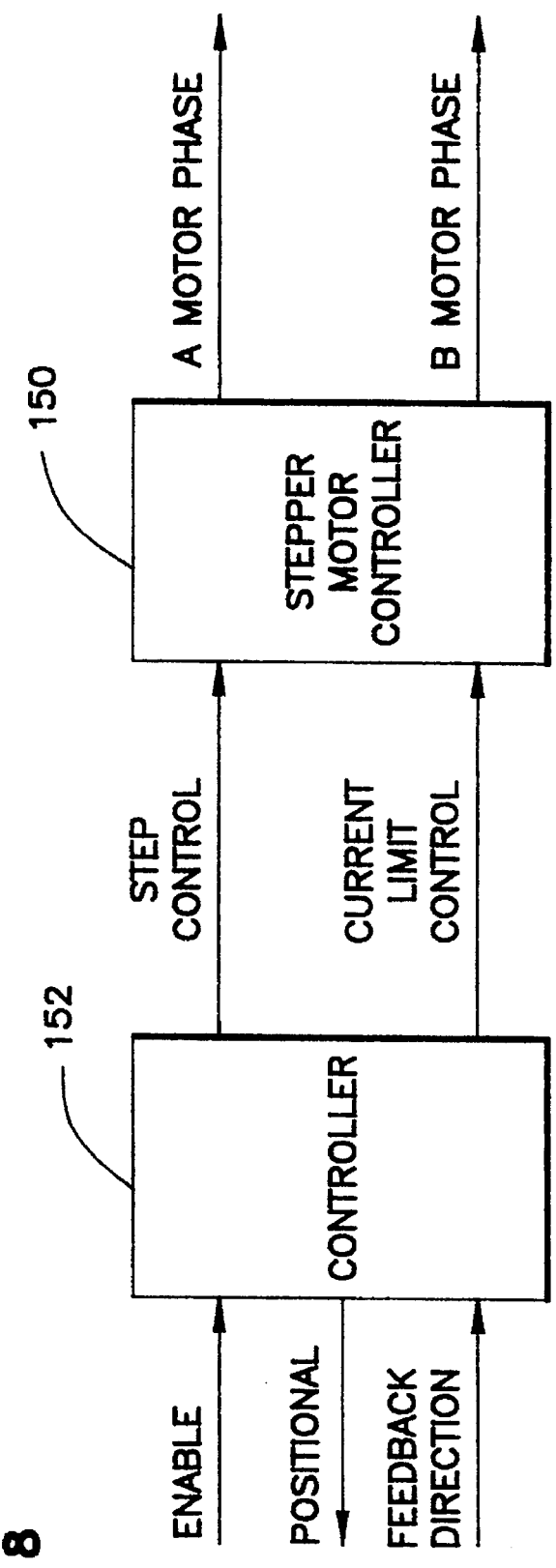
FIG. 8 is a functional block diagram of an embodiment of a sine drive control for the transport motor.
Figure 9:
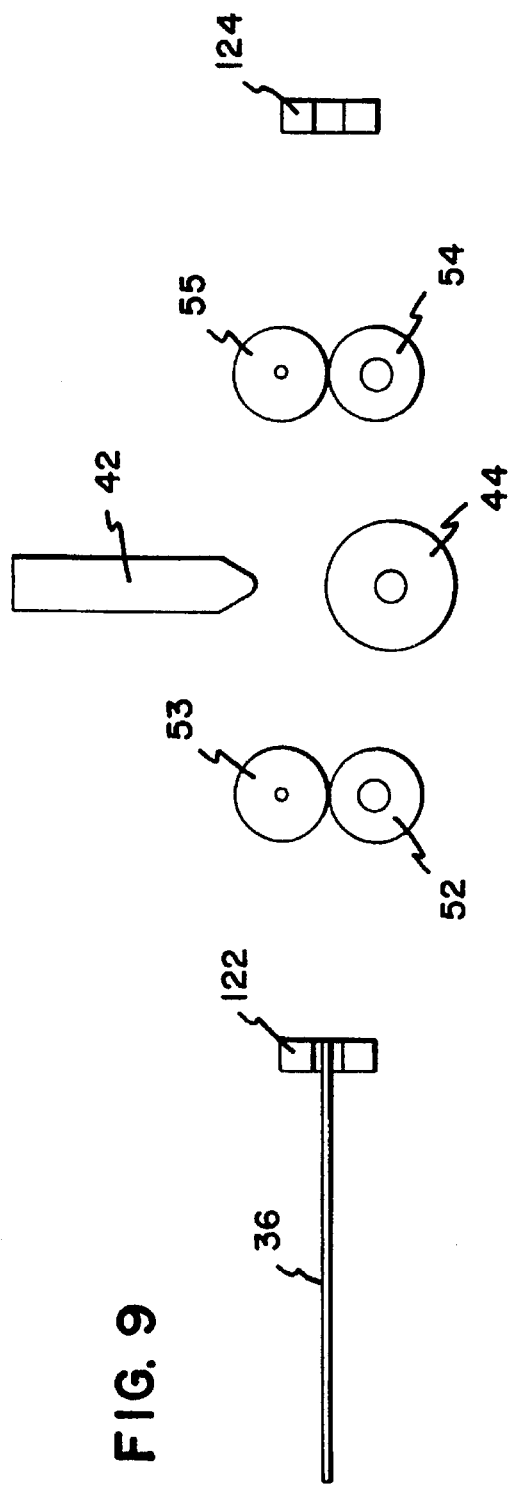
Figure 10:
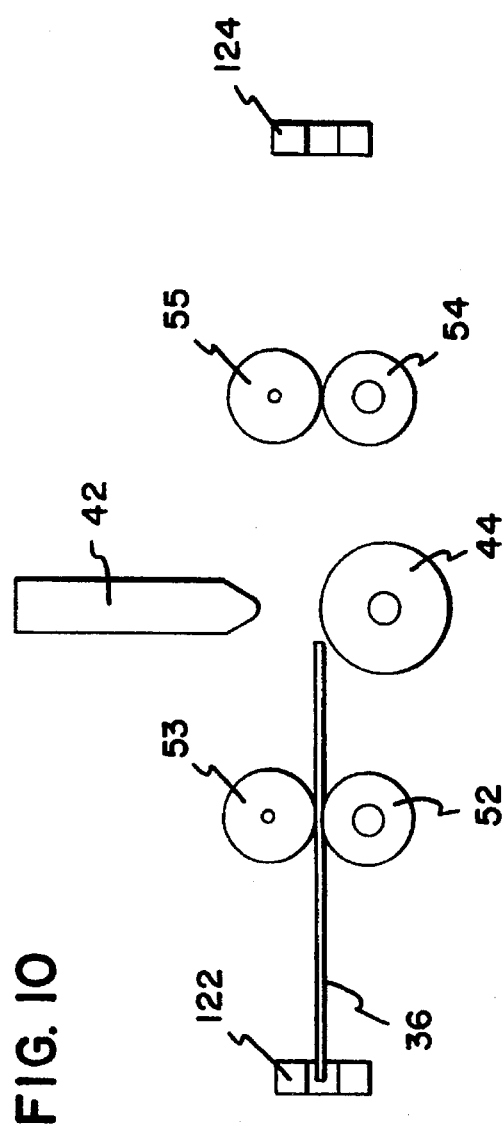
Figure 13:
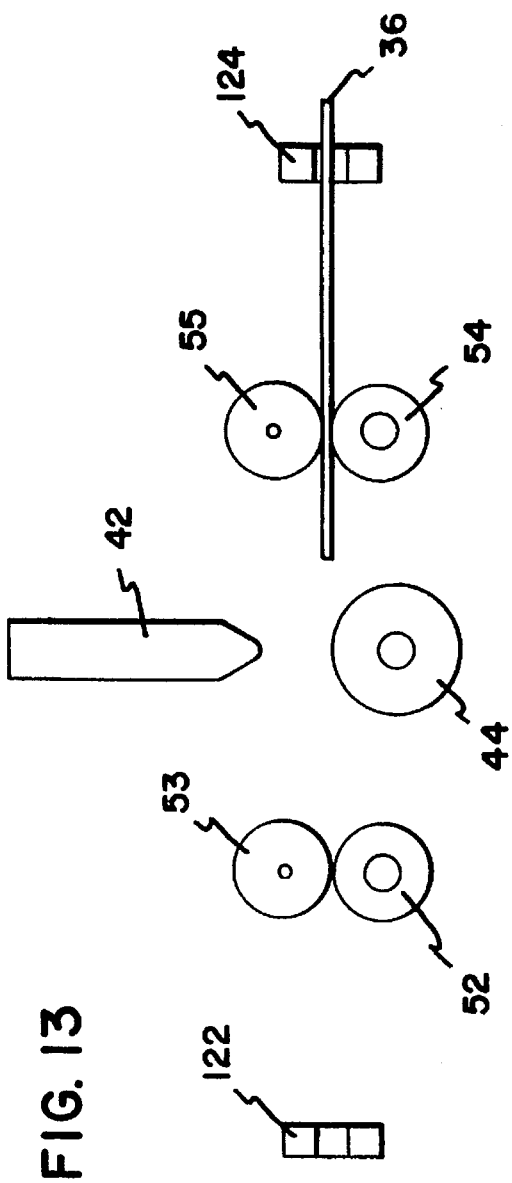
Figure 14:
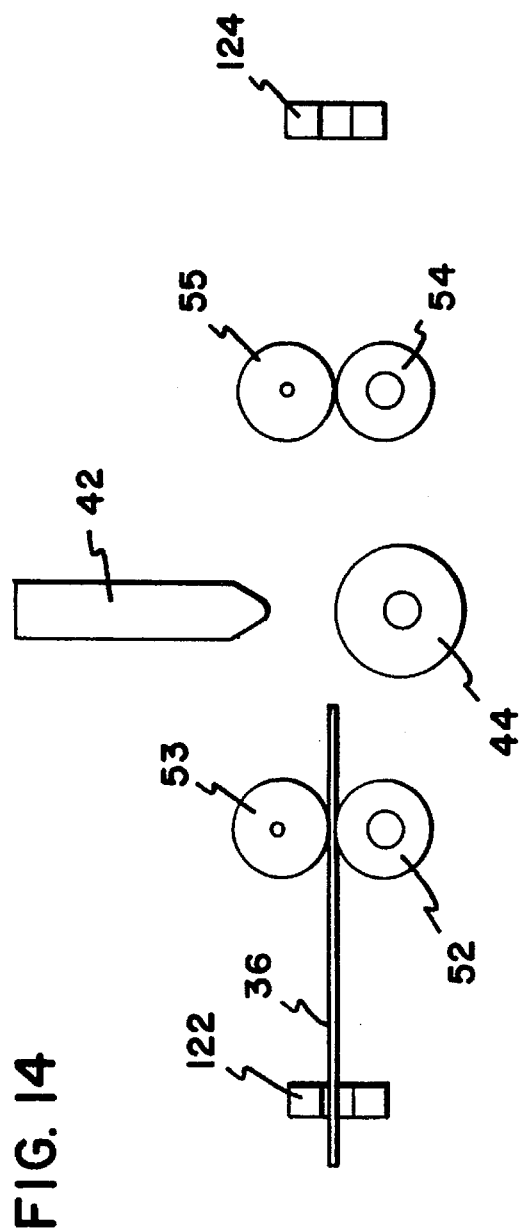

As illustrated in FIG. 7, a suitable printer controller receives input from the host computer system and input from the various sensors and then activates the various motors and actuators used in the printer apparatus. In a preferred embodiment, the printer controller samples the trailing edge sensor every four or two steps of the transport motor to precisely locate the trailing edge of the workpiece. This rapid sampling allows for a very accurate determination of card position. The present embodiment is able to obtain resolutions of plus/minus ½ print column at two steps and ¼ print column at four steps.

A typical printer apparatus using a roller transport system will use a stepper motor to drive the roller transport system with either full or half step control. Step resolutions are typically 1.8 degrees per full step and 0.9 degrees per half step. Microstep controllers of variable resolution are available to allow the current to the stepper motor windings to be controlled in smaller increments such that the motor can be stepped at finer resolutions than 0.9 degrees. These microcircuits are still designed to operate like traditional stepper motor circuits in that one step to the controller will yield one microstep to the motor. In one embodiment of the present invention, a sine control drive circuit 126 is used to produce a low cost circuit that produces sinusoidal current control in continuous fashion to each of the windings of the transport motor. The sign control drive circuit 126 produces a smoother velocity profile for the transport motor than typically observed with a conventional stepper motor control. In addition it removes the burden of stepping from the controlling microprocessor and places it on the sine control circuit. The reduced velocity shift in the transport motor increases the accuracy of printing because it reduces the positional uncertainty between motor poles. The sine drive circuit transmits positional information to the controlling microprocessor at a rate higher than its full step positional accuracy. This provides increased accuracy at reduced cost. The sine drive circuit also increases the accuracy of pass to pass registration during multipass printing.

In one embodiment the sine drive consists of a low cost bipolar stepper motor controller chip 150 and a low cost 16 pin embedded microcontroller 152. The stepper motor controller chip is driven in full step mode with its current limit controlled by the embedded microcontroller. The current limit is regulated sinusoidally so the currents at the A and B motor phases approximates a sine wave. The controlling microprocessor has directional control and an enable. The sine drive circuit returns positional information based on its current limit control and step control state. In operation the controlling microprocessor sets the direction and enables the sine drive microcontroller. The microprocessor then samples the degree detection sensor, and waits for an edge crossing to occur. From the time the edge crossing occurs the positional feedback is used to control the print placement. When the printing is completed, the direction is reversed and the card is recycled through the edge sensor where the motor direction is again reversed and the card is recycled through the edge sensor where the motor direction is again reversed and the process is repeated for the next color. This process is repeated for as many passes as necessary to complete the printing. Note that for each pass, the card is located with respect to the sensor, and then referenced to the positional feedback from the sine drive circuit. The sensor is sampled once for each increment of the positional feedback from the drive circuit. In this embodiment that is four signaling events from the sine drive controller for each full step and eight signalling events for each print line. The printing rate is approximately six mS per line at 300 dots per inch. The print speed is about 0.5 inches per second.

Use of the roller transport during the printing process will now be described generally referring to FIGS. 9–14. Prior to initiating printing, the print head is raised until the print head home photocell is blocked such that the print head is in the home position. The ribbon motor is run to properly position the ribbon color segments for printing. At this point in time, the printer is ready to print on the workpiece. When the workpiece present photocell is blocked, this indicates that a workpiece has been fed to the printer and is upstream of the cleaning rollers. The transport motor is turned on to pull in the workpiece past the cleaning roller (see FIG. 9). The transport motor is run until a trailing edge of the workpiece is detected (see FIG. 10). The transport motor is then run to move the card's leading edge to just beyond the print roller center line (see FIG. 11). The print head motor is then run to lower the print head onto the card. The transport motor is then run for approximately 30 steps while simultaneously running the ribbon drive motor before printing starts. At this point in time, the yellow pass printing begins. The transport motor and the ribbon motor are simultaneously run for the length of yellow color to be printed and then the transport motor is run for approximately 167 steps while simultaneously running the ribbon motor an additional time so as to strip the ribbon from the card. The print head motor is then run to raise the print head (see FIG. 12). The ribbon motor is then run to position the magenta panel on the ribbon for the next printing series. The transport motor is then reversed to transport the workpiece back toward the trailing edge photocell. The trailing edge of the workpiece is transported slightly beyond the trailing edge sensor (see FIG. 14). Then the transport motor is again reversed to transport the workpiece toward the printer roller as was done during the previous pass such that the leading edge of the card is placed slightly beyond the center of the print roller (see FIG. 11). The print head is then lowered onto the workpiece. The transport motor is then run for approximately 30 steps while simultaneously running the ribbon drive before initiating printing. The magenta color pass is then printed in a fashion similar to that of the yellow pass. The printer apparatus then repeats the same steps so as to strip the ribbon from the card, raise the printer head, position the cyan panel and reposition the card at the print roller. The cyan printing pass is then performed to complete the printing of the composite color image.

After printing the cyan pass, the ribbon is again stripped from the card. If mass transfer printing of barcodes or the like is to be accomplished, the black segment might be printed, otherwise the yellow segment of the ribbon is positioned for printing, the printer head is raised, and the printer carriage and transport carriage are moved laterally into alignment with the overlay ribbon for application of the overlay if an overlay is to be applied. The workpiece is then transported by the feed rollers and the cleaning roller back in the direction from which workpiece came for delivery to an output hopper or the like. Of course the workpiece might be transported linearly through the printer apparatus to its opposite end. The next workpiece is then moved into position and the color printing is initiated for that workpiece.

The mechanism for laterally moving the printer carriage assembly and transport carriage assembly with respect to the ribbon supply system so as to align the appropriate ribbon with the print head and workpiece is illustrated in more detail in FIGS. 15–17. In FIG. 15A carriage drive motor 80 is mounted on support frame 40. A pair of guide tracks 200 and 202 as seen in FIG. 15B are secured to a floor of printer apparatus 30. Support frame 40 has a pair of flange members 206 and 208 which are mounted on guide tracks 200 and 202 for lateral movement of support frame 40. The following is a description of the specific attachment of flange member 206 to guide track 200. It should be understood that the attachment of flange member 208 to guide track 202 is the same. Specifically, as seen in FIG. 15B, guide track 200 has a pair of elongated openings 210 and 212 and guide track 202 has a similar pair of elongated openings 211 and 213. Flange member 206 is mounted to guide track 200 by fastening hardware that permits lateral motion of support frame 40 on guide tracks 200 and 202. The fastening hardware will be described with reference to the attachment of flange member 206 at elongated opening 212, it being understood that identical fastening hardware is used to attach flange member 206 at elongated opening 210. As seen in FIG. 15Cj, the fastening hardware includes a guide washer 214 slidably received within elongated opening 212. Guide washer 214 has an opening 216 for receiving a threaded screw 218. A corresponding opening is provided in flange member 206. Thus, to secure flange member 206 on guide track 200, a screw 218 is inserted through the opening in flange member 206 and through opening 216 in guide washer 214 which is mounted in elongated opening 212. A lock washer 220 and washers 222 and 224 serve to slidably secure flange member 206 to guide track 200.

Lateral movement of frame 40 is accomplished by motor 80 and an associated rack and pinion mechanism. A toothed rack 226 is mounted on a sidewall 228 of guide track 200. Motor 80 has a drive shaft 230 with a pinion 232 having teeth which mesh with and engage the teeth of rack 226. Thus, when motor 80 is turned on, rotation of pinion 232 causes frame 40 to move laterally due to the rack and pinion construction.

Figure 16A:
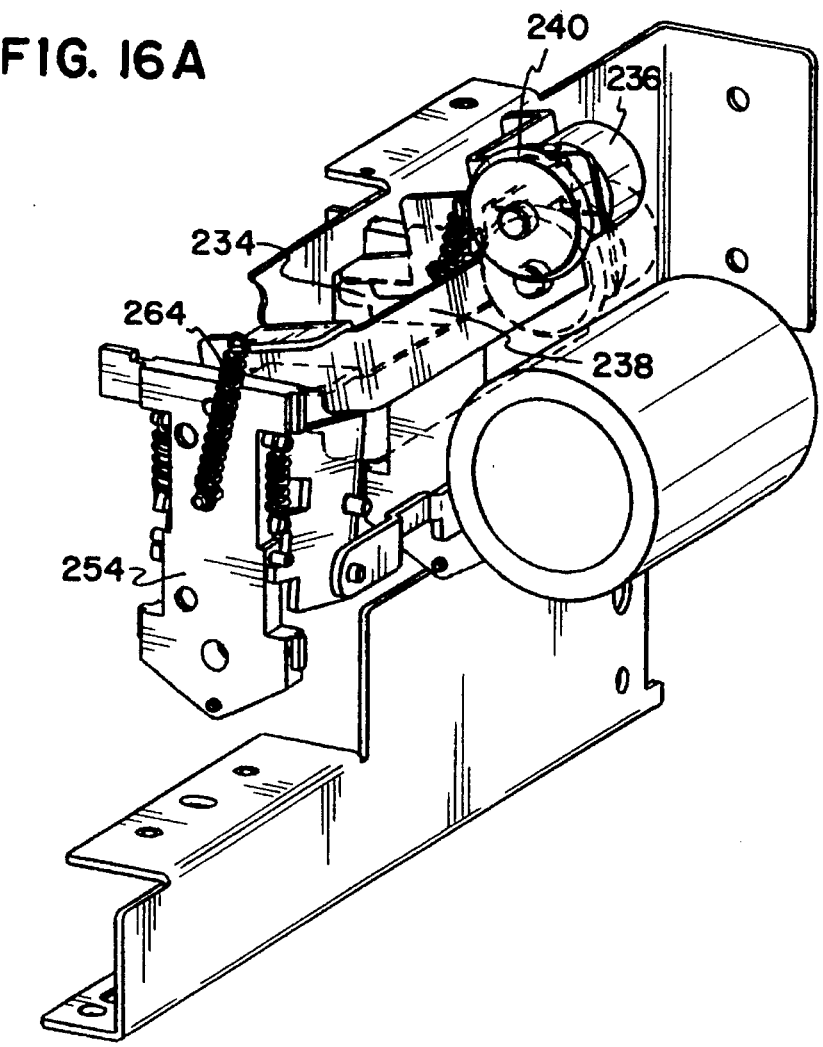
FIG. 16A is a perspective view of the rotary encoder mechanism.
Figures 17A, 17B, 17C:
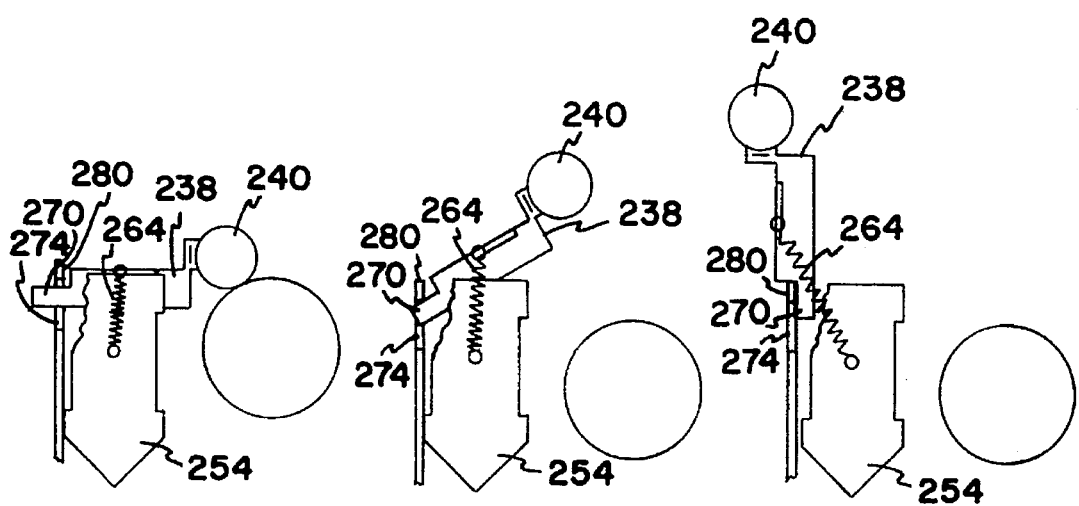
FIG. 17A is a schematic view illustrating engagement of the wheel with the print ribbon roll.
FIG. 17B is a schematic view illustrating disengagement of the wheel from the print ribbon roll.
FIG. 17C is a schematic view illustrating the wheel pivoted into a third position.
Figure 16B:
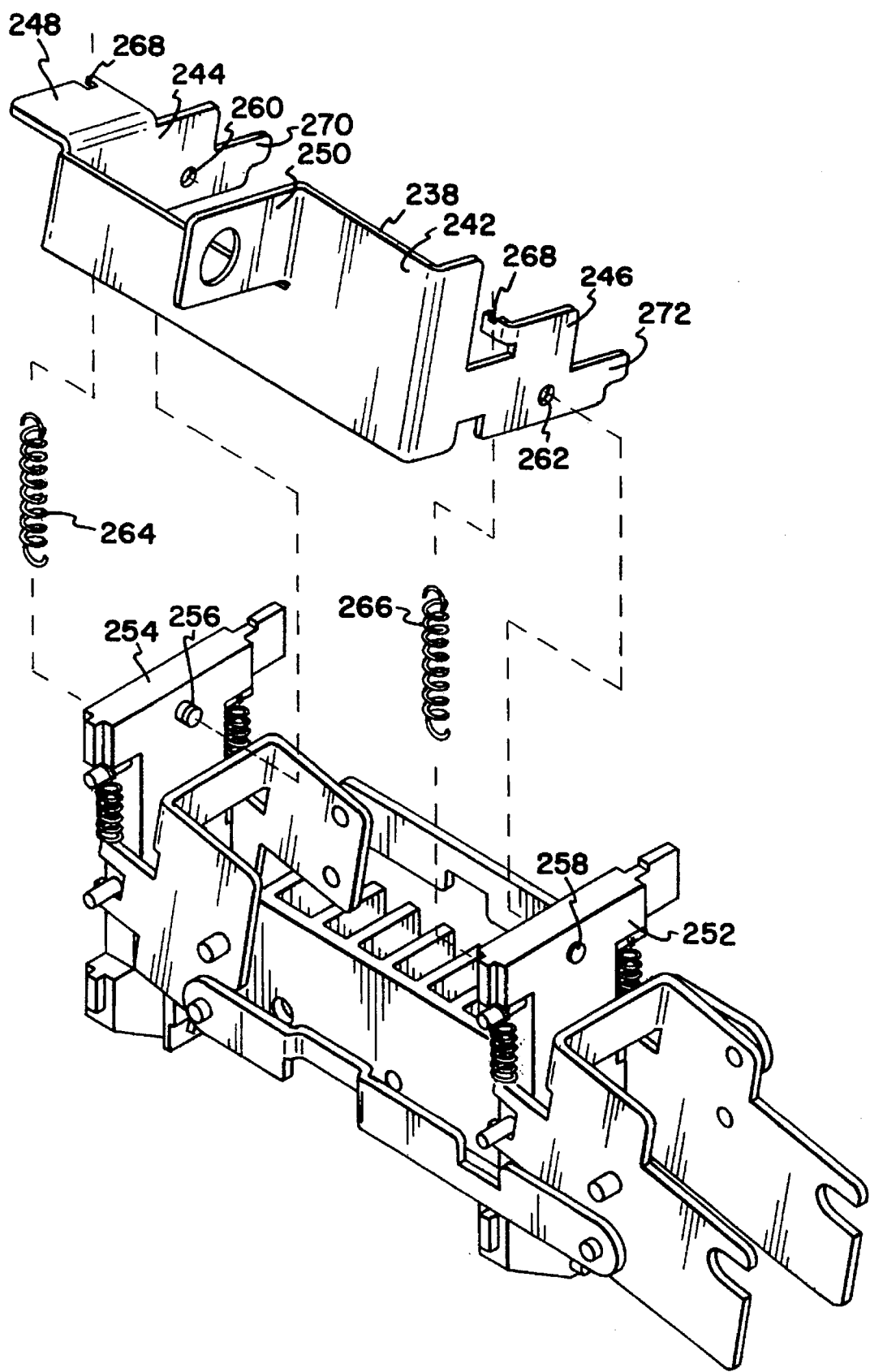
FIG. 16B is a perspective view of the rotary encoder mounting bracket and print head support frame.

In a preferred embodiment of the print roller transport apparatus, a rotary encoder mechanism 234 is provided. As seen in FIG. 16A, mechanism 234 includes a rotary encoder 236 mounted on a bracket 238 which is itself attached to print head lift apparatus 130 as will be described in more detail hereafter. The encoder 236 is a ribbon roller engagement wheel 240 affixed to the motor shaft. As seen in FIG. 16B, bracket 238 has a base member 242, a pair of leg members 244 and 246, a wing member 248 and a rotary encoder mounting member 250. As previously described, rotary encoder 236 is mounted to member 250. Bracket 238 is pivotally mounted to a pair of print head support frame members 252 and 254. A pair of pivot pins 256 and 258 are received within apertures 260 and 262 in leg members 244 and 246, respectively. A pair of positioning and preloading springs 264 and 266 are also connected between bracket 238 and frame members 252 and 254. More specifically, spring 264 is hooked into a recess 268 on wing member 248. The opposite end of spring 264 is connected to a pin (not shown) on frame member 254. One end of spring 266 is attached to an ear 268 extending from leg member 246. The opposite end of spring 266 is attached to a pin (not shown) on frame member 252. Leg members 244 and 246 have extension arms 270 and 272 that are received within openings 274 and 276 in a sidewall 280 of support frame 40 as seen in FIG. 15A. Springs 264 and 266 are over center springs which normally bias bracket 238 and encoder 236 toward the print position with wheel 240 in engagement with a print ribbon roll as shown schematically in FIG. 17A and in phantom in FIG. 16A. In this print position, extension arms 270 and 272 are loosely received within openings 274 and 276. As print head 42 is returned to its home position as described in more detail above, extension arms 270 and 272 are caused to engage sidewall 280 at the top end of openings 274 and 276. This causes bracket 238 to be pivoted on frame members 252 and 254 to position shown in FIG. 16A and schematically in FIG. 17B where engagement wheel 240 is rotated out of engagement with the print ribbon roller. Bracket 238 can be pivoted to a third position as shown in FIG. 17C. When pivoted to this position over center springs 264 and 266 function to retain bracket 238 in the third position until it is manually rotated toward the second position.

In operation, rotary encoder 236 serves several functions. Each function involves the measurement of the amount of ribbon being used. As ribbon is fed from the supply spool such as spool 62 as shown in FIG. 1, rotary encoder 236 is in engagement with the supply spool and pulses are generated. Each pulse corresponds to approximately 0.05 inch of ribbon. Pulses from the rotary encoder 236 are fed to the microprocessor printer controller which is illustrated in block diagram form in FIG. 7. Printer controller also monitors signals from a photocell ribbon sensor 63. Photocell 63 is blind to the primary color panels yellow, magenta, cyan, and tonal black (D2T2 material). Photocell 63 can detect the index mark on the ribbon and solid pigment thermal transfer materials. The signal from the photocell in combination with the pulse count from the encoder allows the microprocessor print controller to perform a number of functions. The presence of three panel D2T2 (yellow, magenta and cyan) is determined by finding the index mark, counting pulses and measuring the distance between the next index mark. In other words, the index mark plus 15.9 inches equals three panel D2T2. The presence of four panel D2T2 (yellow, magenta, cyan, and black thermal transfer is determined by finding the index mark and counting pulses and measuring a distance between the next index mark. The black thermal transfer panel is detected by the photocell. A signal from photocell 63 and ribbon motion indicate to the microprocessor that the black thermal transfer panel is present. The presence of tonal black is determined by motion of the ribbon and no detectable index marks by photocell 63. The presence of thermal transfer is detected by motion and a continuously blocked index mark. Presence of the overlay panel is detected by motion and no detectable index marks. A lack of motion during operation is considered a break in the media and generates a fault signal condition. Encoder 236 thus measures the surface and therefore the actual length of the material used. With regard to variable panel lengths, the encoder 236 allows the printer controller to position the three panel D2T2 and four panel D2T2 panels in the correct position for each particular printing pass. The operator inputs into the microprocessor print controller the panel the length that is used in the printer.

Rotary encoder 236 is manually pivoted to its third position shown in FIG. 17C for replacement or changing of the print ribbon on supply spool 62.

Having read the foregoing description, it is to be understood, that even though numerous characteristics and advantages of various embodiments in accordance with the principles of the invention have been set forth in the foregoing description, together with details of the structure and function of the invention, the disclosure is illustrative only, and changes may be made in detail, especially matters of shape, size and arrangement of the parts within the principles of the invention to the full extent indicated by the broad general meaning of the term in which the appended claims are expressed.

What is claimed is:

1. A workpiece transport apparatus used with a graphics printer having a print head, the transport apparatus comprising:

input feed roller means for feeding the workpiece toward the print head and output feed roller means for feeding the workpiece away from the print head, the input feed roller means and output feed roller means both engaging the workpiece prior to the input feed roller means disengaging from the workpiece;

print roller means aligned with the print head and disposed intermediate of the input and output feed rollers for supporting the workpiece intermediate of the print roller means and the print head;

a single drive motor driving the input and output feed roller means and the print roller means;

sensor means for sensing the position of the workpiece relative to the print head, said sensor means including a trailing edge sensor means disposed upstream of the input feed roller means for sensing a trailing edge of the workpiece, said trailing edge sensor means detecting said trailing edge of the workpiece as the workpiece is moved toward the print head;

control means responsive to signals received from the sensor means for controlling operation of the drive motor; wherein said transport apparatus is mounted on a support frame in a graphics printer housing; and means for moving said support frame laterally wherein the transport apparatus includes means for moving the transport apparatus out of alignment with a first color ribbon and into alignment with a second color ribbon.

2. An apparatus in accordance with claim 1, wherein the drive motor is a stepper motor with multiple steps per print line.

3. An apparatus in accordance with claim 2, wherein the stepper motor has two steps per print line.

4. An apparatus in accordance with claim 1 wherein the sensor means includes a leading edge sensor means disposed downstream of the output feed roller means for sensing a leading edge of the workpiece, said leading edge sensor means detecting the leading edge of the workpiece as the workpiece is moved away from the print head.

5. An apparatus in accordance with claim 1, wherein the drive motor includes a stepper motor; said stepper motor having a drive shaft and a friction driven gear reducer; wherein the apparatus has the friction driven gear reducer connected to the drive shaft.

6. An apparatus in accordance with claim 1, including sine wave drive means for sinusoidally driving the drive motor.

7. An apparatus in accordance with claim 6, wherein the sine wave drive means produces sinusoidal current control in continuous fashion to each of the windings of the transport motor.

8. An apparatus in accordance with claim 7, including a controlling microprocessor, wherein the sine wave drive means transmits positional information to the controlling microprocessor at a rate higher than the full step positional accuracy of the controlling microprocessor.

9. An apparatus in accordance with claim 6, wherein the sine wave drive means includes a bipolar stepper motor controller chip and an embedded microcontroller wherein the current limit of the bipolar stepper motor controller chip is controlled by the embedded microcontroller.

10. An apparatus in accordance with claim 9, wherein the current limit of the bipolar stepper motor controller chip is regulated sinusoidally so that the currents at the A and B motor phases approximates a sine wave.

11. An apparatus in accordance with claim 10, wherein the controlling microprocessor has directional control and an enable for setting the direction of and enabling the sine drive microcontroller.

12. An apparatus in accordance with claim 1, including cleaning roller means for cleaning a surface of the workpiece, the cleaning roller means being driven by the drive motor.

13. An apparatus in accordance with claim 1, including lateral drive means for moving the transport apparatus laterally whereby the transport apparatus can be moved out of alignment with a first ribbon and into alignment with a second ribbon.

14. A workpiece transport apparatus in accordance with claim 1 wherein said transport apparatus is mounted on a support frame in a graphics printer housing and further comprising means for moving said support frame laterally whereby the transport apparatus can be moved out of alignment with a first ribbon and into alignment with a second ribbon.

15. A workpiece transport apparatus in accordance with claim 14 wherein said means for laterally moving said support frame further comprises:

guide means affixed to the printer housing and on which said support frame is mounted for lateral movement;

rack and pinion drive means connected to said support frame and said guide means for moving said support frame laterally on said guide means.

16. A workpiece transport apparatus in accordance with claim 1 further comprising a color supply system including a color ribbon, color ribbon supply spool, a color ribbon take-up spool, and a color ribbon drive motor for printing the workpiece with various pigments; wherein said transport apparatus is mounted on a support frame in a graphics printer housing and further comprising means for moving said support frame laterally whereby the transport apparatus can be moved out of alignment with a first color ribbon and into alignment with a second color ribbon.

17. An apparatus in accordance with claim 1 wherein the apparatus includes cleaning roller means, said cleaning roller means being driven by the single drive motor.

18. A workpiece transport apparatus of claim 1, wherein the distance between the input feed rollers and the trailing edge sensor means is less than a length of the workpiece.

19. An apparatus in accordance with claim 1, further comprising a color supply system including a color ribbon, color ribbon supply spool, a color ribbon take-up spool, and a color ribbon drive motor for printing the workpiece with various pigments.

20. A method of transporting a workpiece past a print head, said method comprising:
    transporting the workpiece through cleaning rollers upstream of input feed rollers;
    sensing a trailing edge of the workpiece upstream from the input feed rollers as the workpiece is moved toward the print head to determine its position;
    transporting the workpiece so sensed through the input feed rollers in a direction toward the print head;
    engaging the workpiece with output feed rollers while the workpiece is still engaged by the input feed rollers;
    printing on the workpiece, wherein said step of printing comprises laterally moving a transport apparatus out of alignment with a first ribbon and into alignment with a second ribbon; and
    transporting the workpiece in a direction away from the print head using the output feed rollers.

21. A method in accordance with claim 20, wherein the step of transporting includes advancing the workpiece less than a column per interval of movement.

22. A graphics printer comprising:
    a print head;
    a print ribbon supply spool and print ribbon take-up spool adapted to feed a print ribbon into position between said print head and a workpiece;
    input feed roller means for feeding the workpiece toward said print head and output feed roller means for feeding the workpiece away from said print head, said input feed roller means and said output feed roller means both engaging workpiece prior to said input feed roller means disengaging from the workpiece;
    print roller means aligned with said print head and disposed intermediate of said input and said output feed rollers for supporting the workpiece intermediate of said print roller means and said print head;
    a single drive motor driving said input and said output feed roller means and said print roller means;
    sensor means for sensing the position of the workpiece relative to said print head, said sensing means including a trailing edge sensor means disposed upstream of the input feed roller means for sensing a trailing edge of the workpiece as the workpiece is moved toward the print head;
    control means responsive to signals received from said sensor means for controlling operation of said drive motor;
    rotary encoder means cooperating with said print ribbon supply spool for generating control signals representing the length of print ribbon fed from said supply spool; and
    control means responsive to said signals from said rotary encoder means for controlling the operation of the printer
    a transport apparatus that is mounted on a support frame in a graphics printer housing; and
    means for moving said support frame laterally, wherein the transport apparatus includes means for moving the transport apparatus out of alignment with a first color ribbon and into alignment with a second color ribbon.

23. A workpiece transport apparatus used with a graphics printer having a print head, the transport apparatus comprising:
    input feed roller means for feeding the workpiece toward the print head and output feed roller means for feeding the workpiece away from the print head, the input feed roller means and output feed roller means both engaging the workpiece prior to the input feed roller means disengaging from the workpiece;
    print roller means aligned with the print head and disposed intermediate of the input and output feed rollers for supporting the workpiece intermediate of the print roller means and the print head;
    a single drive motor driving the input and output feed roller means and the print roller means;
    sensor means for sensing the position of the workpiece relative to the print head;
    control means responsive to signals received from the sensor means for controlling operation of the drive motor; and
    lateral drive means for moving the transport apparatus laterally whereby the transport apparatus can be moved out of alignment with a first ribbon and into alignment with a second ribbon.

24. A workpiece transport apparatus used with a graphics printer having a print head, the transport apparatus comprising:
    input feed roller means for feeding the workpiece toward the print head and output feed roller means for feeding the workpiece away from the print head, the input feed roller means and output feed roller means both engaging the workpiece prior to the input feed roller means disengaging from the workpiece;
    print roller means aligned with the print head and disposed intermediate of the input and output feed rollers for supporting the workpiece intermediate of the print roller means and the print head;
    a single drive motor driving the input and output feed roller means and the print roller means;
    sensor means for sensing the position of the workpiece relative to the print head; and
    control means responsive to signals received from the sensor means for controlling operation of the drive motor;
    wherein said transport apparatus is mounted on a support frame in a graphics printer housing and further comprising means for moving said support frame laterally whereby the transport apparatus can be moved out of alignment with a first ribbon and into alignment with a second ribbon.

25. A workpiece transport apparatus in accordance with claim 24 wherein said means for laterally moving said support frame further comprises:
    a guide means affixed to the printer housing and on which said support frame is mounted for lateral movement;
    rack and pinion means connected to said support frame and said guide means for moving said support frame laterally on said guide means.

26. A printer in accordance with claim 11 wherein the printer includes cleaning roller means, said cleaning roller means being driven by the single drive motor.

27. A workpiece transport apparatus used with a graphics printer having a print head, the transport apparatus comprising:

input feed roller means for feeding the workpiece toward the print head and output feed roller means for feeding the workpiece away from the print head, the input feed roller means and output feed roller means both engaging the workpiece prior to the input feed roller means disengaging from the workpiece;

print roller means aligned with the print head and disposed intermediate of the input and out put feed rollers for supporting the workpiece intermediate from the print roller means and the print head;

a single drive motor driving the input and output feed roller means and the print roller means;

sensor means for sensing the position of the workpiece relative to the print head, said sensor means including a trailing edge sensor means disposed upstream of the input feed roller means for sensing a trailing edge of the workpiece as the workpiece is moved toward the print head;

control means responsive to signals received from the sensor means for controlling operation of the drive motor; and sine wave drive means for sinusoidally driving the drive motor, said drive means producing sinusoidal current control in continuous fashion to each of the windings of the transport motor, and said sine wave drive means including a bipolar stepper motor controller chip and an embedded microcontroller wherein the current limit of the bipolar stepper motor controller chip is controlled by the embedded microcontroller; wherein said transport apparatus is mounted on a support frame in a graphics printer housing; and means for moving said support frame laterally, wherein the transport apparatus includes means for moving the transport apparatus out of alignment with a first color ribbon and into alignment with a second color ribbon.

28. A workpiece transport apparatus used with a graphics printer having a print head, the transport apparatus comprising:

input feed roller means for feeding the workpiece toward the print head and output feed roller means for feeding the workpiece away from the print head, the input feed roller means and output feed roller means both engaging the workpiece prior to the input feed roller means disengaging from the workpiece;

print roller means aligned with the print head and disposed intermediate of the input and output feed rollers for supporting the workpiece intermediate of the print roller means and the print head;

a single drive motor driving the input and output feed roller means and the print roller means;

sensor means for sensing the position of the workpiece relative to the print head, said sensor means including a trailing edge sensor means disposed upstream of the input feed roller means for sensing a trailing edge of the workpiece;

control means responsive to signals received from the sensor means for controlling operation of the drive motor;

a color supply system including a color ribbon, color ribbon supply spool, a color ribbon take-up spool, and a color ribbon drive motor for printing on the workpiece with various pigments; wherein said transport apparatus is mounted on a support frame in a graphics printer housing; and means for moving said support frame laterally wherein the transport apparatus includes means for moving the transport apparatus out of alignment with a first color ribbon and into alignment with a second color ribbon.

29. A graphics printer comprising:

a print head;

a print ribbon supply spool and print ribbon take-up spool adapted to feed a print ribbon into position between said print head and a workpiece;

input feed roller means for feeding the workpiece toward said print head and output feed roller means for feeding the workpiece away from said print head, said input feed roller means and said output feed roller means both engaging workpiece prior to said input feed roller means disengaging from the workpiece;

print roller means aligned with said print head and disposed intermediate of said input and said output feed rollers for supporting the workpiece intermediate of said print roller means and said print head;

a single drive motor driving said input and said output feed roller means and said print roller means;

sensor means for sensing the position of the workpiece relative to said print head, said sensing means including a trailing edge sensor means disposed upstream of the input feed roller means for sensing a trailing edge of the workpiece;

control means responsive to signals received from said sensor means for controlling operation of said drive motor;

rotary encoder means cooperating with said print ribbon supply spool for generating control signals representing the length of print ribbon fed from said supply spool;

control means responsive to said signals from said rotary encoder means for controlling the operation of the printer; and cleaning roller means, said cleaning roller means being driven by the single drive motor;

a transport apparatus that is mounted on a support frame in a graphics printer housing; and means for moving said support frame laterally, wherein the transport apparatus includes means for moving the transport apparatus out of alignment with a first color ribbon and into alignment with a second color ribbon.

* * * * *